(12) United States Patent
Wolcott et al.

(10) Patent No.: US 11,724,588 B2
(45) Date of Patent: Aug. 15, 2023

(54) ADDITIVE MANUFACTURED GRILLE AND METHOD

(71) Applicant: GM GLOBAL TECHNOLOGY OPERATIONS LLC, Detroit, MI (US)

(72) Inventors: Paul J. Wolcott, Macomb, MI (US); Andrew Thomas Cunningham, Royal Oak, MI (US); Zachary P. Steffes, West Bloomfield, MI (US); Jeffrey B. Harris, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 396 days.

(21) Appl. No.: 17/027,844

(22) Filed: Sep. 22, 2020

(65) Prior Publication Data

US 2022/0089015 A1 Mar. 24, 2022

(51) Int. Cl.
| | |
|---|---|
| *B60K 11/06* | (2006.01) |
| *B33Y 10/00* | (2015.01) |
| *B33Y 80/00* | (2015.01) |
| *B29C 64/30* | (2017.01) |
| *B33Y 40/00* | (2020.01) |
| *B29C 64/153* | (2017.01) |
| *B29L 31/30* | (2006.01) |

(52) U.S. Cl.
CPC ............ *B60K 11/06* (2013.01); *B29C 64/153* (2017.08); *B29C 64/30* (2017.08); *B33Y 10/00* (2014.12); *B33Y 40/00* (2014.12); *B33Y 80/00* (2014.12); *B29L 2031/3005* (2013.01)

(58) Field of Classification Search
CPC ....... B60K 11/06; B60K 11/08; B60K 11/085; B33Y 10/00; B33Y 40/00; B33Y 80/00; B60R 19/52; B60R 2019/525; B60R 2019/527; B29C 64/153; B29C 64/30; B29L 2031/3005
See application file for complete search history.

(56) References Cited

U.S. PATENT DOCUMENTS

| 927,530 | A | * | 7/1909 | Harris, Jr. | ............... B60R 21/34 293/41 |
| 7,407,035 | B2 | * | 8/2008 | Stinauer | ............... H04R 25/609 181/129 |
| 2019/0196449 | A1 | | 6/2019 | Zhang et al. | |
| 2019/0228114 | A1 | | 7/2019 | Griffith et al. | |

FOREIGN PATENT DOCUMENTS

DE  102017106621 A1  10/2018

* cited by examiner

*Primary Examiner* — Loren C Edwards
(74) *Attorney, Agent, or Firm* — Lorenz & Kopf LLP (57) ABSTRACT

Products and methods are provided for additive manufacturing of products in a collapsed state for post printing expansion in preparation for use in their intended application. A product includes interconnecting members configured for forming by printing in a collapsed state, with joints between the interconnecting members configured for relative movement of the interconnected members from the collapsed state to an expanded state. The interconnecting members define a larger package size in the expanded state than in the collapsed state. The joints are freely moveable in the collapsed state and are locked in place in the expanded state.

17 Claims, 7 Drawing Sheets

ADDITIVE MANUFACTURED GRILLE AND METHOD

INTRODUCTION

The present disclosure generally relates to additive manufacturing, and more particularly relates to the manufacture of complex components with multiple autonomous parts that are printed in one configuration, reconfigured and locked together to form an assembled unit ready for use.

Additive manufacturing or 3D printing technologies have come into widespread use due to their desirable qualities such as efficiency and flexibility. Fusion based additive manufacturing processes create a product by depositing a layer of material, melting, and fusing the deposited material particles. Powder bed fusion involves depositing an entire layer of powder and applying an energy source to fuse select particles together to form the intended product, one layer at a time. The powder bed is contained in a build box that has a limited size. The size limitations restrict the application of the process to parts that fit within the confines of the build box/powder bed. As a result, building large products by additive manufacturing requires building several separate components of the product and attaching them together after they are built. Accordingly, the efficiency of additive manufacturing is diminished since separate builds significantly increase the time needed to complete the product.

In addition, creativity in design variations and the ability to provide design customization is limited by manufacturing techniques such as injection molding when additive manufacturing is not an economical option. Some designs do not lend themselves to such manufacturing processes and small batch custom designs still require a significant capital investment to create the product.

Accordingly, it is desirable to provide methods that have greater flexibility in how larger sized products are built using additive manufacturing. In addition, it is desirable to provide features of an additive manufactured product that facilitate a more efficient form of build. Furthermore, other desirable features and characteristics of the present invention will become apparent from the subsequent detailed description and the appended claims, taken in conjunction with the accompanying drawings and the foregoing technical field and background.

SUMMARY

A number of embodiments include products and methods for printing a product in one configuration and locking the product in another configuration for use in its application. A product formed by printing in additive manufacturing may include interconnecting members configured for forming in a collapsed state and joints between the interconnecting members. The joints are configured for relative movement of the interconnected members from the collapsed state to an expanded state. The interconnecting members define a larger package size in the expanded state than in the collapsed state. The joints are freely moveable in the collapsed state, and are locked in place in the expanded state.

In an additional embodiment, the joints are captured joints. A connector is integral with one of the interconnecting members and extends through an opening provided in another of the interconnecting members. The interconnecting members are printed with the connector extending through the opening.

In an additional embodiment, the interconnecting members include a number of backside supports configured to poke-through adjacent interconnecting members when stacked together in the collapsed state during printing and when plural products are packaged together.

In an additional embodiment, the interconnecting members comprise internal members and perimeter members. The perimeter members define at least a part of a perimeter of the product that surrounds the internal members when the product is in the expanded state.

In an additional embodiment, at least some of the internal members include perimeter segments that define at least a part of the perimeter of the product.

In an additional embodiment, the perimeter segments include non-captured joints configured to be snapped together when the product is in the expanded state.

In an additional embodiment, the product comprises a grille for a vehicle.

In an additional embodiment, the interconnecting members include a number of backside supports configured to couple with the vehicle.

In an additional embodiment, the product has a first length in the collapsed state and has a second length in the expanded state. The second length is at least three times the collapsed length in magnitude.

In a number of additional embodiments, a method of forming a product includes additive manufacturing printing of interconnecting members in a collapsed state. Joints are formed between the interconnecting members. The joints are configured for relative movement of the interconnected members from the collapsed state to an expanded state After printing, the interconnecting members are expanded from the collapsed state to the expanded state and locked in the expanded state. The interconnecting members define a larger package size in the expanded state than in the collapsed state. The joints are freely moveable in the collapsed state and are locked in place in the expanded state.

In an additional embodiment, the joints as are printed captured joints with a connector integral with one of the interconnecting members and extending through an opening in another of the interconnecting members. The interconnecting members are printed with the connector extending through the opening.

In an additional embodiment, a plural number of the products are printed simultaneously in a single build box. Backside supports are printed on at least some of the interconnecting members. The plural number of products are packaged in the build box for build with at least some of the backside supports poking through adjacent of the plural number of products.

In an additional embodiment, the interconnecting members are printed as internal members and perimeter members. The perimeter members define at least a part of a perimeter of the product that surrounds the internal members when the product is in the expanded state.

In an additional embodiment, perimeter segments are printed on at least some of the internal members. The perimeter segments define at least a part of the perimeter of the product.

In an additional embodiment, non-captured joints are printed on the perimeter segments. The non-captured joints are snapped together when the product is in the expanded state.

In an additional embodiment, the product is designed as a grille for a vehicle.

In an additional embodiment, a build configuration is determined for the product to fit in a single build box in the collapsed state.

In an additional embodiment, the grille is printed in its entirety in one integral unit, ready for expansion and assembly in a vehicle.

In an additional embodiment, the determined build configuration includes determining a first length of the grille in the collapsed state and a second length of the grille in the expanded state. The second length is at least three times the collapsed length in magnitude.

In a number of additional embodiments, a method of forming a product includes designing the product as a grille of a vehicle. A build configuration is determined for the grille to fit within a single build box of an additive manufacturing system. Interconnecting members of the product are printed in a collapsed state. Joints are formed between the interconnecting members. The joints are configured for relative movement of the interconnected members from the collapsed state to an expanded state. After printing, the interconnecting members are moved from the collapsed state to the expanded state and locked in the expanded state, The interconnecting members define a larger package size in the expanded state than in the collapsed state. As printed, the joints are freely moveable when in the collapsed state and are locked in place when in the expanded state.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, products and methods are disclosed for various applications such as to enable building relatively large products and/or multiple products in a single build box using additive manufacturing. Products may be printed in a collapsed state and then expanding after printing. The methods disclosed herein are applicable to other applications as will be appreciated by one skilled in the art. The disclosed approach enables building larger parts through additive manufacturing all in one build cycle. This advantageously results in improved efficiency and significantly lower build times, which enables broader design and creativity flexibility. In addition, the ability to customize/personalize products is expanded, where many different design choices may be made available efficiently.

Figure 1:
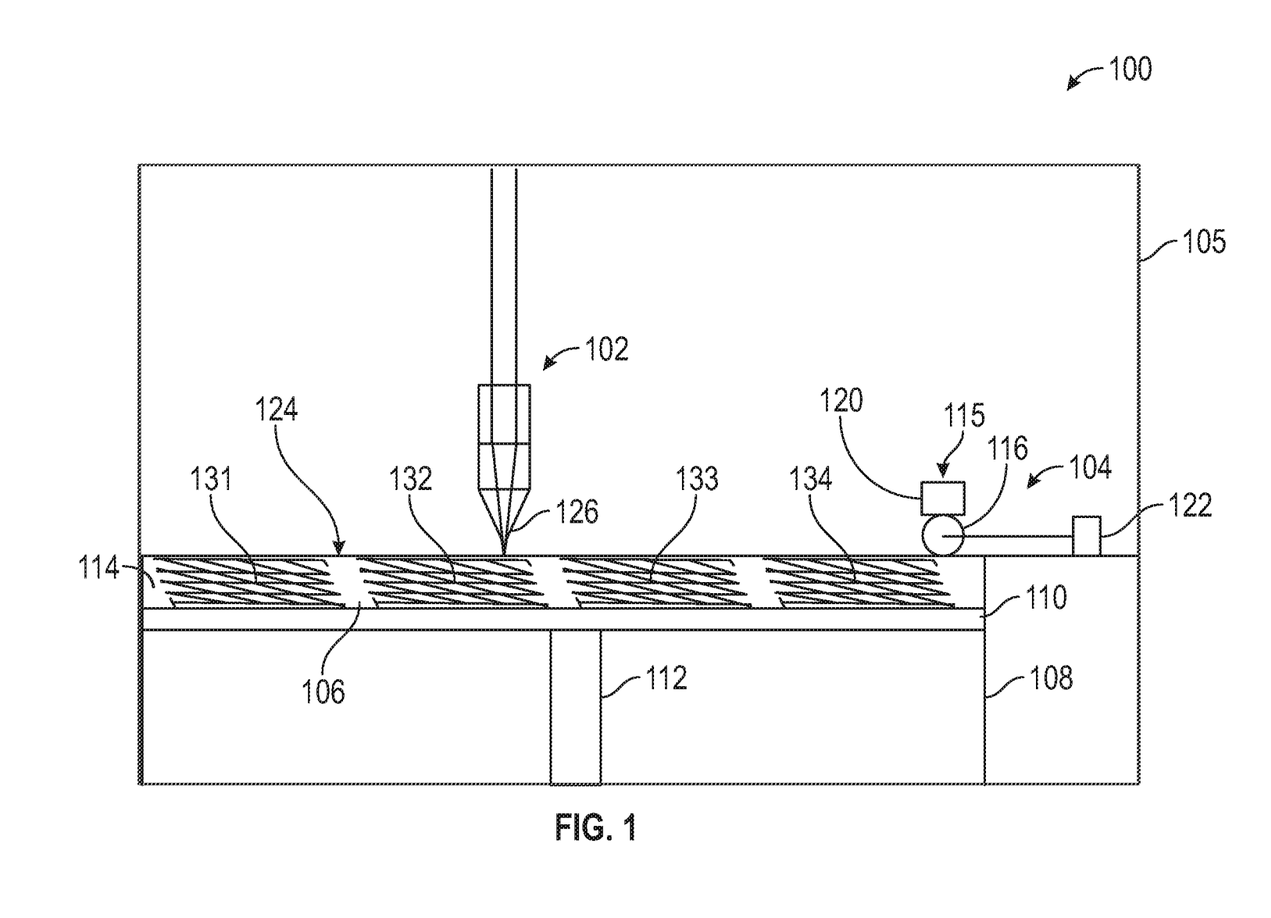
FIG. 1 is a schematic diagram of an additive manufacturing system in the process of building a group of products each configured in a collapsed state, in accordance with various embodiments.

Referring to FIG. 1, an additive manufacturing system 100 is schematically illustrated. In general, the additive manufacturing system 100, which may also be referred to as a 3D printing system, includes an energy delivery system 102, which may be of the laser type or another type, a material spreader in the form of a material deposition system 104, a build chamber 106 defined by a build box 108, and a build platform 110 with a lift 112. In a number of embodiments, a gas delivery system (not shown), may be included for delivery of an inert gas to an outer chamber 105 to provide a favorable corrosion-free environment for the build. In the current embodiment the additive manufacturing system 100 is illustrated as a powder bed fusion type additive manufacturing/3D printing system. In other embodiments other additive manufacturing approaches may be used such as directed energy deposition, or others.

In the current embodiment, the additive manufacturing system 100 is configured for the application of a powder material to the build box 108 by the material deposition system 104, and melting/fusing of the powder by the energy delivery system 102 via a controlled exposure to a laser beam 126. A material/powder 114 is applied by a leveler as the material deposition system 104 in a series of layers on the build platform 110. The leveler 115 may include a roller 116 that applies and spreads a predefined amount of powder from a reservoir 120 and is operated by a drive system 122 as it spreads the powder on the substrate plate building up the powder bed 124. In other embodiments, other mechanisms may be used to distribute the powder such as a brush, blade, movement of the reservoir 120 across the build platform 110 to distribute the powder, or others.

Energy for fusing the powder particles is provided by the energy delivery system/laser 102. The laser beam 126 is directed on the powder bed 124 to selectively melt the powder 114 for fusion of its particles. In a number of embodiments, the energy delivery system 102 may employ plural lasers to speed manufacture. In other embodiments, another form of energy source may be employed.

The build platform 110 defines the bottom of the build box 108 and is mounted with a lift 112 for lowering during the build and for raising following the build or in preparation for the build. The powder bed 124 is built up as the layers are deposited, and the product(s) 131-134 being built are formed within the powder bed 124. When the formation process for a given layer is completed, the build platform 110 may be lowered by the amount of the layer thickness and the next powder layer is applied. Applying the laser beam 126 via the energy delivery system 102 fuses the most recently added layer with the previously generated layer within the outline of the product(s) 131-134. This process is repeated until the entire design geometry of the component(s) 131-134 is generated. The unfused powder between the product(s) in the powder bed 124 may be reused.

In this embodiment, the product(s) 131-134 being created from the powder bed 124 are large items with a complex structure, or may be components of an even larger item. Specifically, the product(s) are grilles for the front of a vehicle which have a structure with openings provided for air passage. Grilles are products that have a high degree of aesthetic and functional qualities. Grilles cannot generally be economically formed in additive manufacturing processes because their size, which is dictated by the size of the vehicle, exceeds that available in build boxes. Accordingly, the products 131-134 are created in a collapsed state as shown in FIG. 1, which enables fitting one or more into the build box 108.

Figure 2:
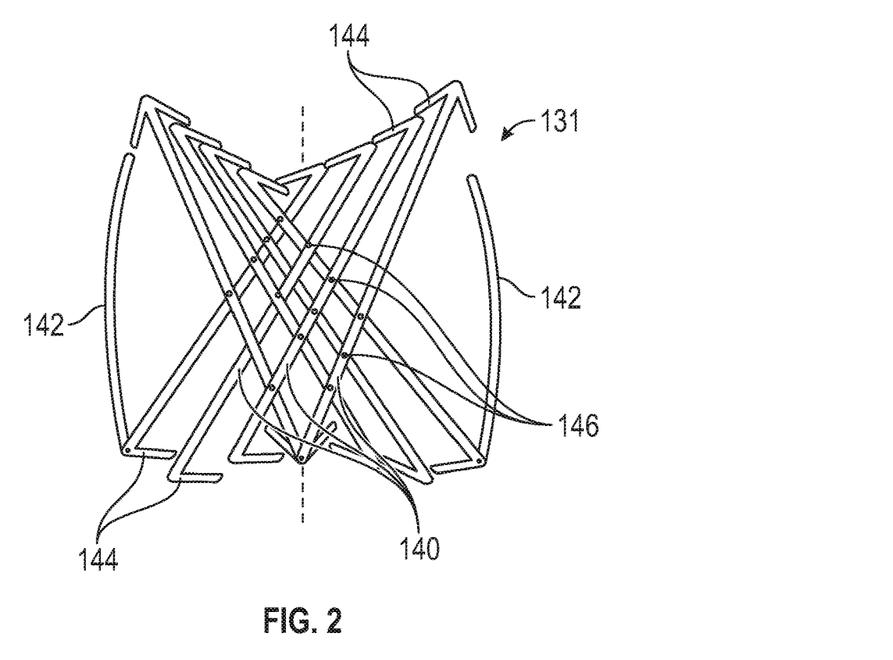
FIG. 2 is a schematic illustration of one of the products of FIG. 1 shown in the collapsed state, in accordance with various embodiments.

Referring to FIG. 2, one product 131 is shown schematically in isolation full built and remaining in the collapsed state. The product 131 includes a number of individual interconnecting members including internal members 140 and perimeter members 142. The internal members 140 may include perimeter segments 144, depending on the product's design. The perimeter segments 142 may form a part of the product's perimeter when reconfigured to the expanded state. The various members 140, 142 are contained together in one integral unit by joints 146, which may be of a captured printed type. As such, when in the as-printed collapsed state the unitary product 131 is consolidated into a relatively small package as compared to a completed grille.

Figure 3:
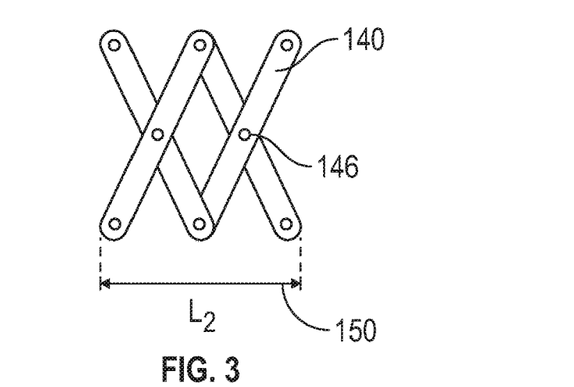
FIG. 3 is a schematic, detail illustration of a portion of the product of FIG. 2 in the collapsed state, in accordance with various embodiments.
Figure 4:
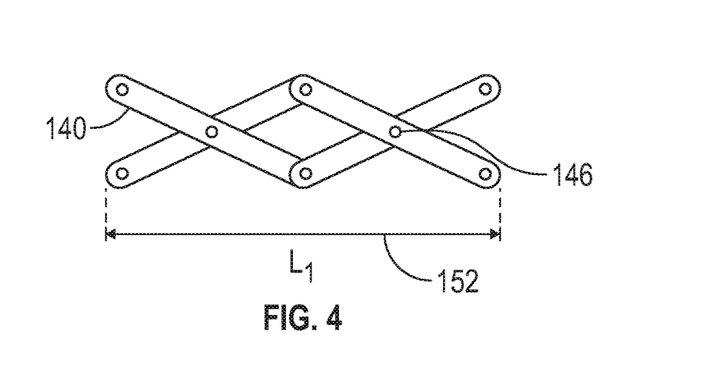
FIG. 4 is a schematic, detail illustration of the portion of the product of FIG. 3 shown in an expanded state, in accordance with various embodiments.

FIGS. 3-4 schematically illustrate how the members 140, 142 respond during expansion from the collapsed state. In FIG. 3, four representative internal members 140 are shown in the as-printed collapsed state. The joints 146 are captured so that the internal members 140 are connected together by the joints 146 as-printed. In the collapsed state, the illustrated area of the product 131 has a dimension referred to as a collapsed length 150. In FIG. 4, the internal members 140 are shown reconfigured to an expanded state, where the members 140 have been rotated relative to each other about the joints 146. In the expanded state, the illustrated area of the product 131 has a dimension, referred to as an expanded length 152, that is substantially larger than the collapsed length 150. For example, in the current embodiment, the expanded length 152 may be three times that of the collapsed length 150. In a number of embodiments, the expanded length 152 is the dimension of the product 131 as a grille measured laterally, across the front of its associated vehicle. In other embodiments, the size difference of the two states may be different including greater, depending on the design details of the product 131. While the current disclosure describes the advantage of being able to print larger parts in an integral unit, it should be noted that the enabled use of additive manufacturing expands the design options available for grilles. For example, complex structures that cannot be injection molded may be created using the disclosed additive manufacturing approach.

Figure 5:
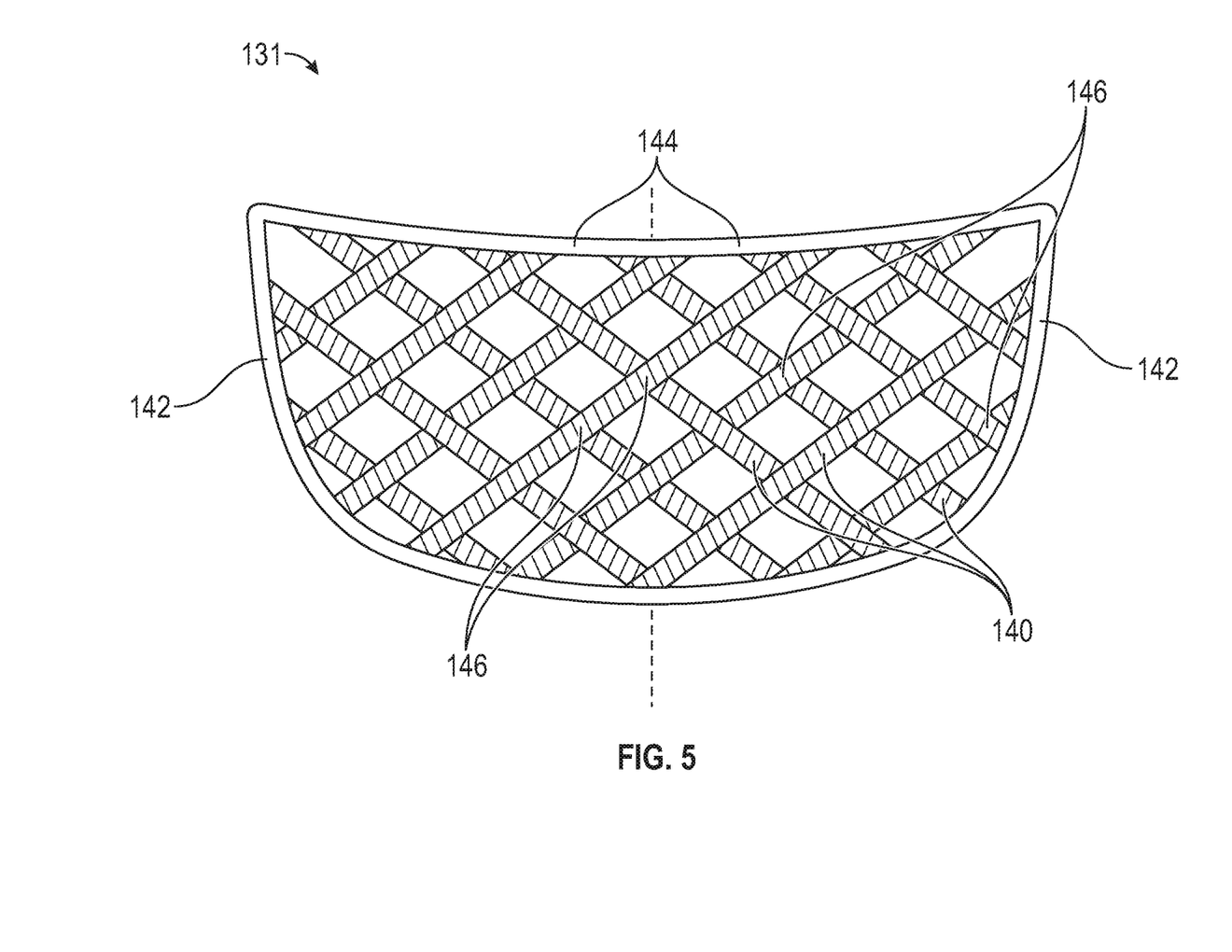
FIG. 5 is an illustration of the product of FIG. 1 shown in an expanded fixed state ready for assembly in its intended application, in accordance with various embodiments.

As shown in FIG. 5, the product 131 is depicted in a fully expanded and locked together state. The internal members 140 and the perimeter members 142 are moved to their final design positions and orientations. As shown, the perimeter segments 144 of the internal members 140 have moved to the perimeter of the product 131. The joints 146 are locked in place so that the members 140, 142 may no longer rotate relative to one another. Locking among and between the members 140, 142 may be accomplished by integral latches, bonding, fusing, welding, elastic averaging, or other means.

Figure 6:
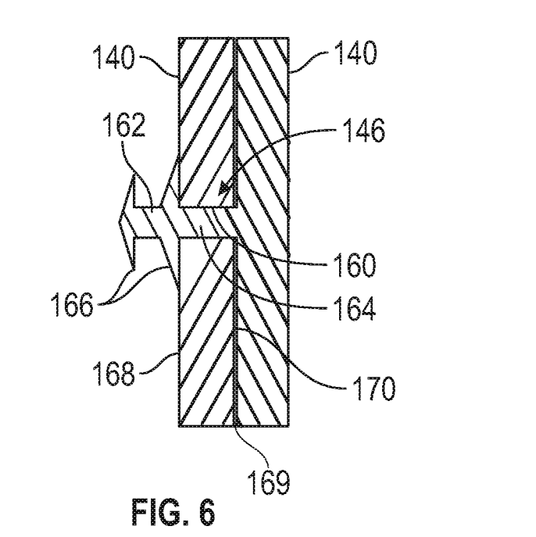
FIG. 6 is a detail illustration of a captured printed joint of the product of FIG. 1, in accordance with various embodiments.
Figure 7:
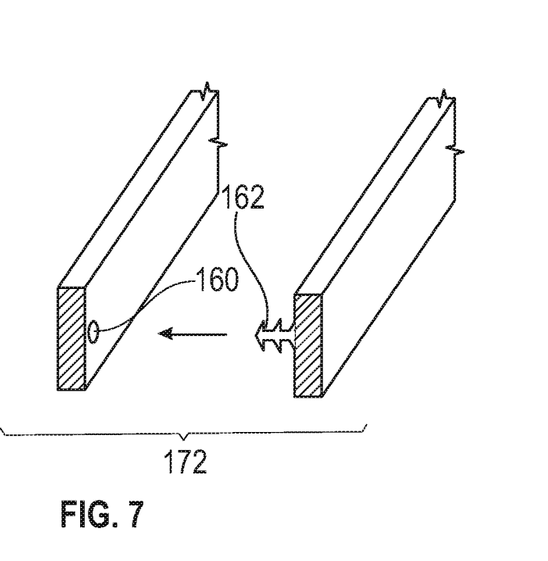
FIG. 7 is a detail illustration of a printed non-captured joint of the product of FIG. 1 prepared for mating during or after expansion of the product, in accordance with various embodiments.
Figure 8:
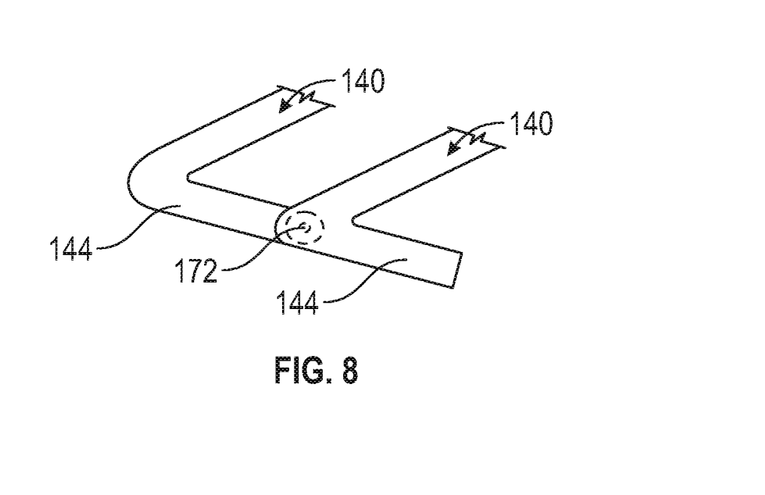
FIG. 8 is a detail illustration of the printed joint of FIG. 7, shown mated and locked in place after expansion of the product, in accordance with various embodiments.

FIG. 6 illustrates an example of one of the joints 146, which is formed in the printed, captured approach. One internal member 140 is printed with an opening, which in the current embodiment is a circular opening that extends completely through the member 140. Another internal member 140 is printed with a projecting tree shaped connector 162 with a cylindrical section 164 that extends through the opening 160 and a series of barbs 166 disposed beyond the back-side 168 of the member 140, capturing the connector 162 in the opening 160. The front-side of the member 140 that has the opening 160, faces and is disposed against the member 140 that has the connector 162, with a gap 172 sufficient to allow movement between the members 140. The opening 160 and the connector 162 may be simultaneously printed with a small clearance between their mating surfaces so that the members freely move via rotation relative to one another immediately following printing. The illustrated connector 162 is but one example of the types of printed connectors that may be employed. The barbs 166 may be formed such that the joint 146 may be disassembled, or they may be formed such that the joint 146 may not be disassembled. FIG. 7 illustrates an example of a joint 172 that is printed in an uncaptured state where the members 140 may be snapped together after the product 131 is expanded. Accordingly, as-printed, the connector 162 does not extend through the opening 160. FIG. 8 illustrates that this approach is useful with the perimeter segments 144, where the size of the product 131 in the collapsed state of FIG. 2 may be optimized by using some of the non-captured joints 172 for connection, post printing.

Figures 9, 10:
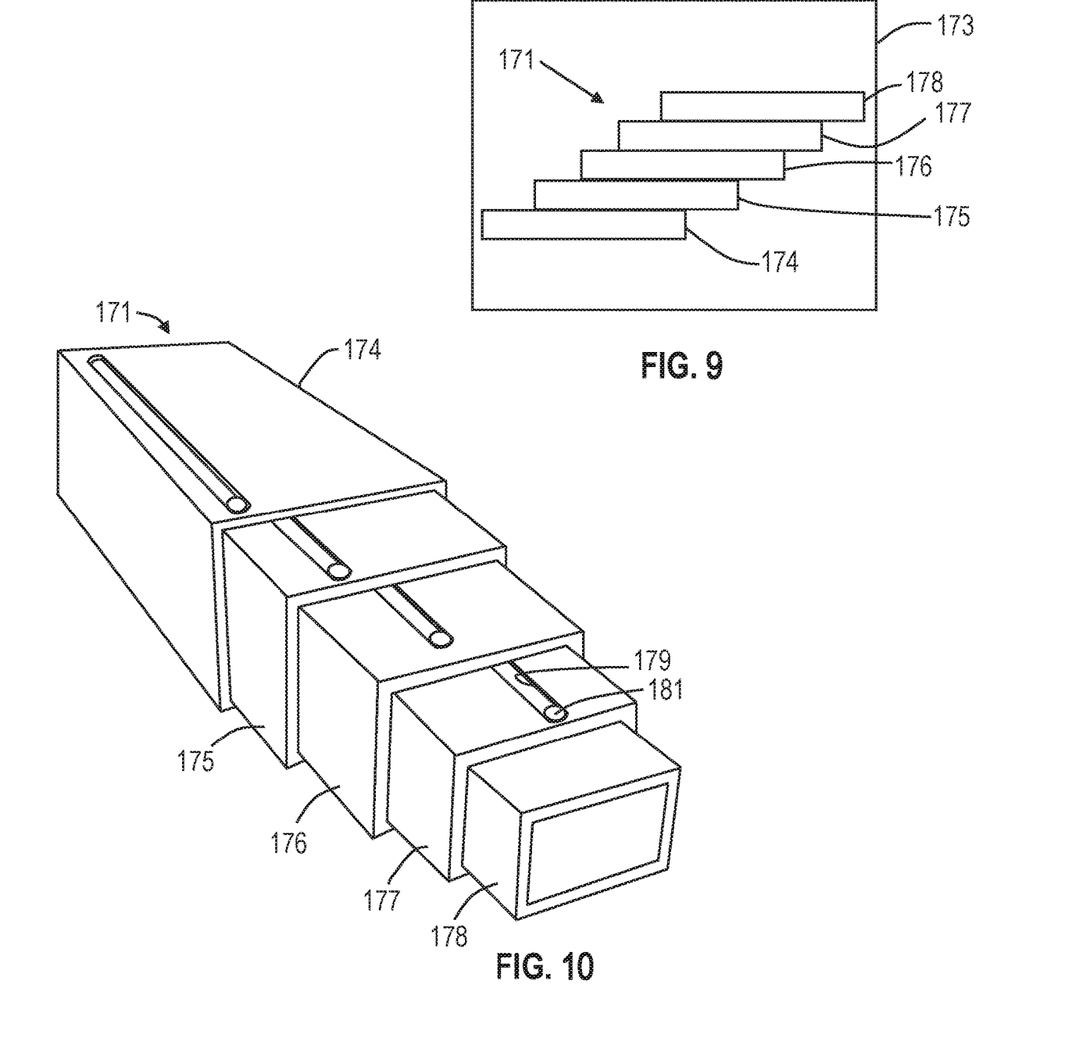
FIG. 9 is a schematic illustration of the additive manufacturing build of a product that is reconfigurable by translation movement, in accordance with various embodiments.
FIG. 10 is a schematic illustration of the additive manufacturing build of a telescoping product that is reconfigurable by translation movement, in accordance with various embodiments
Figure 11:
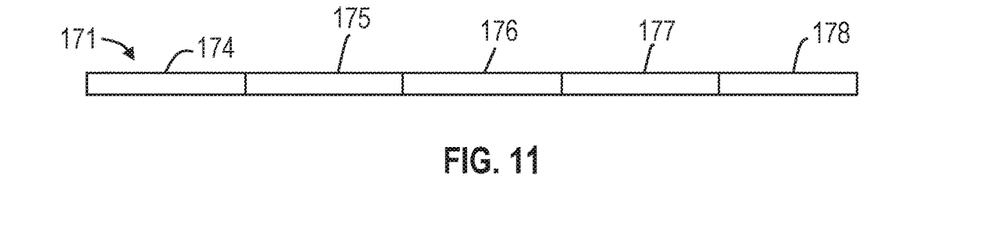
FIG. 11 is a schematic illustration of the product of FIGS. 9 and 10 reconfigured after build, in accordance with various embodiments.

Referring to FIGS. 9, 10 and 11, schematically illustrated is a product 171 built to be reconfigured by movement other than rotation after build. As shown in FIG. 9, in the collapsed state the product 171 fits within the build chamber 173 with a number of interconnecting members designated as members 174-178 stacked together, in this case in an offset arrangement. In other embodiments, the product 171 may be built in another collapsed state, for example, so that it telescopes when reconfigured as shown in FIG. 10. In FIG. 11, the members 174-178 are shown reconfigured to an expanded state, where the members 174-178 have been moved by translation relative to each other. The product 171 may have captured joints and/or may be built with slides or other structures for reconfiguration after printing. For example, as shown in FIG. 10, each member 174-178 includes a slide 179 and/or a pin 181. In this embodiment, the slides 179 are formed as slotted openings in the respective member 174-177 for mating with a pin 181 on the respective member 175-178. The slides 179 and the pins 181 may be printed while the product 171 is being printed. Clearance is left between the material defining the slide 179 and its mating pin 181 so that the members 174-178 move by translation relative to one another following printing.

After being reconfigured, the members 174-178 may be locked in place at the pins 181 or at other locations where the members 174-178 mate, such as by integral latches, bonding, fusing, welding, elastic averaging, or other means.

Figure 12:
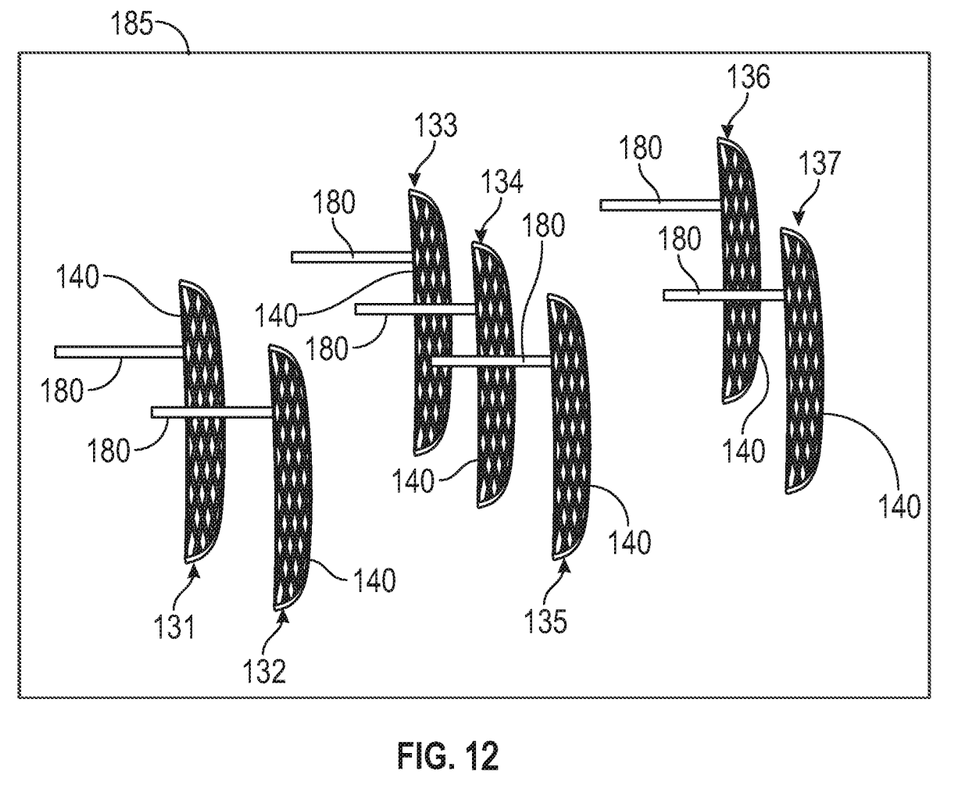
FIG. 12 is a schematic illustration depicting the stackable nature of the products of FIG. 1 with backside supports, in accordance with various embodiments.
Figure 13:
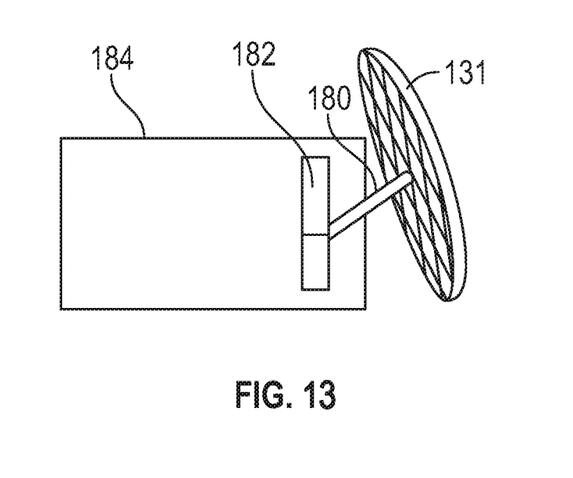
FIG. 13 is a detail illustration of a printed integral backside support of the product of FIG. 1 assembled in a vehicle application.

The use of integral back-side supports with the products 131-134 and additional products 135-137 is illustrated in FIG. 12. The supports 180 on the representative internal members 140 may be used for attaching the product(s) 131-137 to a mating structure when assembled in their final application. For example, with a grille as shown in FIG. 13, the supports 180 may be used to attach the product 131 to a radiator frame 182 of a vehicle 184. The back-side supports 180 are printed as part of the integral unit and are able to "poke through" adjacent products in the same print volume for better packing, driving lower cost. In addition, when the products 131-137 are shipped in a collapsed state, the poke-through features allow for smaller packaging and increased efficiency. FIG. 13 also illustrates assembly of the product 131 into its application where the back-side supports 180 are coupled with the radiator frame 182.

Figure 14:
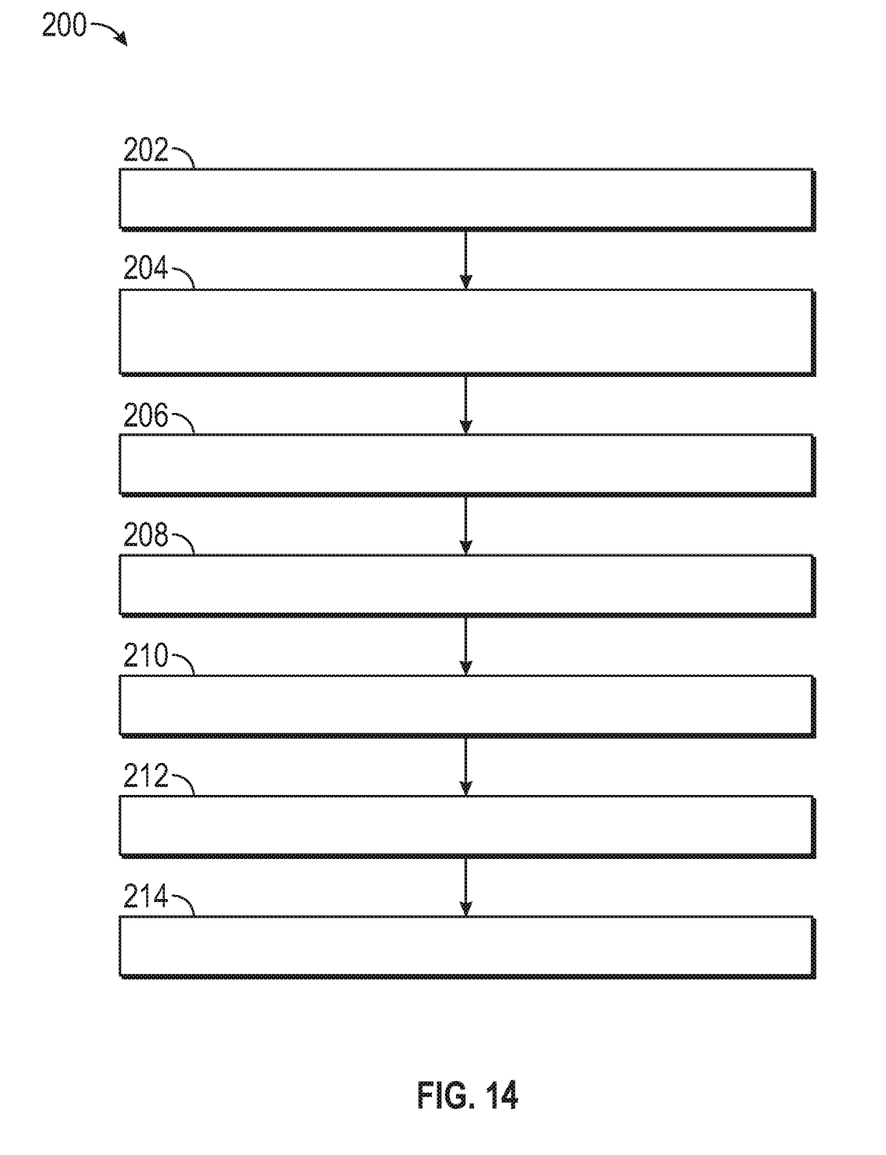
FIG. 14 is a flowchart illustrating a process for building the products described herein, in accordance with various embodiments.

Referring to FIG. 14, a process 200 is illustrated that may be carried out using the additive manufacturing system 100 for building any of the products 131-137 in a single printing production cycle using a single machine. The process 200 begins with designing 202 the product 131-137 that will be manufactured. The process 200 continues with determining 204 the build configuration of the product 131-137. The configuration is selected to fit within a single build box 108 and therefore, is configured in a collapsed state relative to that in which the product 131-137 will be configured in its final application. The determination 204 includes the selection of which members will be internal members 140 and which will be perimeter members 142, and is made based on the design of the product 131-137. The determination 204 includes identifying whether and which internal members 140 may have perimeter segments 144 based on the design of the part and the degree of collapse-state reduction desired between the lengths 150, 152. The determination 204 includes locating of the joints 146, which are generally located at intersections between the members 140, 142. The determination 204 includes whether the design of the product 131-137 requires non-captured joints 172 and their location, or whether all joints may be captured type joints 146. The determination 204 includes locating any needed back-side supports 180 and the orientation of the products 131-137 in the build box 108 so that the back-side supports poke-through adjacent products 131-137 without touching.

With the collapsed state configuration including joining strategy and required back-side features determined 204, the process 200 continues with setting up the additive manufacturing system 100 and printing 206 the product(s) 131-137 in the collapsed state with joints 146, 172 and any back-side supports 180 as determined 204. Printing 206 may be carried out by any number of applicable additive manufacturing processes and includes printing one or more product 131-137 in a single build box 108. In the collapsed state. Following completion of the printing 206, the product(s) 131-137 is/are removed 208 from the build box 108 and any loose powder may be recycled.

The as-printed product(s) 131-137 may be shipped in the collapsed state to another facility taking advantage of the poke-through aspect of the back-side supports 180, or the product may be completed at the same site at which printing 206 is carried out. In either case, the process 200 includes expanding 210 the product(s) 131-137 and locking 212 the joints 146, 172 in place so that the product(s) 131-137 is/are in a rigid state. As noted above, a number of processes/approaches may be used for locking 212. Any desired steps such as finishing, plating, painting, etc. may be carried out on the product(s) 131-137. The process 200 concludes with assembling 214 the product 131 into its application, such as assembling a grille into a vehicle. The assembling includes coupling any back-side supports 180 with their mating structures in the application.

Through the embodiments disclosed herein, large products that previously couldn't be printed at one time in a single build box may be more efficiently printed. The products may be printed in a collapsed state, expanded, locked in place, and then used in their application. The approach is applicable to products with a grid-like structure of interconnected elongated members such as vehicle grilles, and to other types of designs. The approach enables unlocking the design flexibility benefits of added manufacturing for a new class of products.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements and/or steps without departing from the scope of the disclosure as set forth in the appended claims and the legal equivalents thereof.

What is claimed is:

1. A product formed by printing in additive manufacturing, the product comprising:
a plurality of interconnecting members configured for forming by the printing in a collapsed state, the plurality of interconnecting members including a plurality of internal members and a plurality of perimeter segments; and
a plurality of joints between the plurality of internal members configured for a relative movement of the plurality of interconnecting members from the collapsed state to an expanded state,
wherein, at least some of the plurality of perimeter segments each form an integral part of a respective internal member of the plurality of internal members in a fixed orientation relative to the respective internal member and project from the respective internal member at an angle and not in line with the respective internal member,
wherein each perimeter segment of the plurality of perimeter segments forms a part of a perimeter of the product when in the expanded state, wherein the perimeter completely surrounds the plurality of internal members,
wherein the plurality of perimeter segments are configured to move to the perimeter during the relative movement from the collapsed state to the expanded state;
wherein the plurality of interconnecting members define a larger package size in the expanded state than in the collapsed state,
wherein the plurality of joints are freely moveable in the collapsed state and are locked in place in the expanded state,
wherein the product comprises a grille for a vehicle, and wherein the plurality of interconnecting members include a number of backside supports coupled with a radiator frame of the vehicle.

2. The product of claim 1, wherein the plurality of joints comprise captured joints with a connector integral with one of the plurality of interconnecting members extending through an opening provided in another of the plurality of interconnecting members, wherein the plurality of interconnecting members are printed with the connector extending through the opening.

3. The product of claim 1, wherein the number of backside supports are configured to poke-through adjacent the plurality of interconnecting members when in the collapsed state and when a plurality of the products are packaged together.

4. The product of claim 1, wherein the plurality of perimeter segments define a frame around the plurality of internal members.

5. The product of claim 1, wherein at least some of the plurality of perimeter segments comprise two of the plurality of perimeter segments that project from a single of the plurality of internal members and that define a corner of the perimeter when in the expanded state.

6. The product of claim 5, wherein the plurality of perimeter segments include non-captured joints configured to be snapped together when the product is in the expanded state.

7. The product of claim 1, wherein the product has a first length in the collapsed state and has a second length in the expanded state, wherein the second length is at least three times the first length.

8. A method of forming a product, comprising:
printing, by additive manufacturing, a plurality of interconnecting members in a collapsed state, the plurality of interconnecting members including a plurality of internal members and a plurality of perimeter segments;
forming a plurality of joints between the plurality of internal members that are configured for relative movement of the plurality of interconnecting members from the collapsed state to an expanded state;
forming at least some of the plurality of perimeter segments to each form an integral part of a respective internal member of the plurality of internal members in a fixed orientation relative to the respective internal member and project from the respective internal member at an angle and not in line with the respective internal member;
expanding the plurality of interconnecting members from the collapsed state to the expanded state; and
locking the plurality of interconnecting members in the expanded state,
moving the plurality of perimeter segments to a perimeter of the product during the expanding from the collapsed state to the expanded state, so that each perimeter segment of the plurality of perimeter segments forms a part of the perimeter of the product when in the expanded state, wherein the perimeter completely surrounds the plurality of internal members;
wherein the plurality of interconnecting members define a larger package size in the expanded state than in the collapsed state,
wherein the plurality of joints are freely moveable in the collapsed state and are locked in place in the expanded state,
wherein the product comprises a grille for a vehicle, and wherein the plurality of interconnecting members include a number of backside supports coupled with a radiator frame of the vehicle.

9. The method of claim 8, comprising printing the plurality of joints as captured joints with a connector integral with one of the plurality of interconnecting members and extending through an opening in another of the plurality of interconnecting members, wherein the plurality of interconnecting members are printed with the connector extending through the opening.

10. The method of claim 8, comprising:
printing a plural number of the products simultaneously in a single build box;
printing the number of backside supports on at least some of the plurality of interconnecting members;
packaging the plural number of the products in the build box for build with at least some of the backside supports poking through adjacent of the plural number of the products.

11. The method of claim 8, comprising:
printing the plurality of interconnecting members as the plurality of internal members and the plurality of perimeter segments, wherein the plurality of perimeter segments define at least a part of the perimeter of the product that surrounds the plurality of internal members when the product is in the expanded state.

12. The method of claim 11, comprising printing the plurality of perimeter segments on at least some of the plurality of internal members.

13. The method of claim 12, comprising: printing non-captured joints on the plurality of perimeter segments; and snapping the non-captured joints together when the product is in the expanded state.

14. The method of claim 8, comprising determining a build configuration of the product to fit in a single build box in the collapsed state.

15. The method of claim 14, comprising printing the grille, in its entirety in one integral unit, ready for expansion and assembly in the vehicle.

16. The method of claim 14, wherein determining the build configuration comprises determining a first length of the grille in the collapsed state and a second length of the grille in the expanded state, wherein the second length is at least three times the first length.

17. A method of forming a product, comprising:
designing the product as a grille of a vehicle;
determining a build configuration of the grille to fit within a single build box of an additive manufacturing system;
printing, by the additive manufacturing system, a plurality of interconnecting members in a collapsed state, the plurality of interconnecting members including a plurality of internal members and a plurality of perimeter segments;
forming at least some of the plurality of perimeter segments to each form an integral part of a respective internal member of the plurality of internal members in a fixed orientation relative to the respective internal member and project from the respective internal member at an angle and not in line with the respective internal member;
forming a plurality of joints between the plurality of interconnecting members configured for relative movement of the plurality of internal members from the collapsed state to an expanded state;
expanding the plurality of interconnecting members from the collapsed state to the expanded state; and locking the plurality of interconnecting members in the expanded state; and moving the plurality of perimeter segments to a perimeter of the product during the expanding from the collapsed state to the expanded state, so that each perimeter segment of the plurality of perimeter segments forms a part of the perimeter of the product when in the expanded state, wherein the perimeter completely surrounds the plurality of internal member;

wherein the plurality of interconnecting members define a larger package size in the expanded state than in the collapsed state, wherein the plurality of joints are freely moveable in the collapsed state and are locked in place in the expanded state, and wherein the plurality of interconnecting members include a number of backside supports coupled with a radiator frame of the vehicle.

\* \* \* \* \*